US012795423B2

(12) United States Patent
Wigard et al.

(10) Patent No.: US 12,795,423 B2
(45) Date of Patent: Nov. 10, 2026

(54) AVOIDING UNNECESSARY RADIO MEASUREMENT GAPS IN A NON-TERRESTRIAL NETWORK, AND RELATED DEVICES, METHODS AND COMPUTER PROGRAMS

(71) Applicant: Nokia Technologies Oy, Espoo (FI)

(72) Inventors: Jeroen Wigard, Aalborg (DK); Rafhael Medeiros De Amorim, Aalborg (DK); Mads Lauridsen, Aalborg (DK)

(73) Assignee: Nokia Technologies Oy, Espoo (FI)

( * ) Notice: Subject to any disclaimer, the term of this patent is extended or adjusted under 35 U.S.C. 154(b) by 308 days.

(21) Appl. No.: 18/410,658

(22) Filed: Jan. 11, 2024

(65) Prior Publication Data

US 2024/0267772 A1 Aug. 8, 2024

(30) Foreign Application Priority Data

Feb. 3, 2023 (FI) .................................... 20235103

(51) Int. Cl.
*H04W 24/10* (2009.01)
*H04W 24/08* (2009.01)
*H04W 84/06* (2009.01)

(52) U.S. Cl.
CPC ........... *H04W 24/10* (2013.01); *H04W 24/08* (2013.01); *H04W 84/06* (2013.01)

(58) Field of Classification Search
CPC ...... H04W 24/10; H04W 24/08; H04W 84/06
USPC ........................................................ 370/329
See application file for complete search history.

(56) References Cited

U.S. PATENT DOCUMENTS

| | | | | |
|---|---|---|---|---|
| 9,408,120 | B2 * | 8/2016 | Kim | H04W 36/0088 |
| 9,578,523 | B2 * | 2/2017 | Behravan | H04W 24/00 |
| 10,848,231 | B2 | 11/2020 | Cui et al. | |
| 11,184,788 | B2 * | 11/2021 | Wu | H04W 76/10 |
| 11,297,522 | B2 | 4/2022 | Ma et al. | |
| 12,114,215 | B2 * | 10/2024 | Zheng | H04W 24/02 |
| 12,120,573 | B2 * | 10/2024 | Niu | H04W 36/32 |
| 12,177,830 | B2 * | 12/2024 | Jeon | H04W 76/30 |
| 12,207,077 | B2 * | 1/2025 | Tao | H04W 48/16 |
| 12,262,441 | B2 * | 3/2025 | Jiang | H04W 52/0274 |

(Continued)

FOREIGN PATENT DOCUMENTS

| | | | | |
|---|---|---|---|---|
| TW | 202332225 A * | 8/2023 | | H04W 36/0088 |
| WO | WO-2018063075 A1 * | 4/2018 | | H04L 5/0096 |

(Continued)

OTHER PUBLICATIONS

G. Geraci, D. López-Pérez, M. Benzaghta and S. Chatzinotas, "Integrating Terrestrial and Non-Terrestrial Networks: 3D Opportunities and Challenges," in IEEE Communications Magazine, vol. 61, No. 4, pp. 42-48, Apr. 2023. (Year: 2023).*

(Continued)

*Primary Examiner* — Melvin H Pollack
(74) *Attorney, Agent, or Firm* — Barta Jones, PLLC

(57) ABSTRACT

Devices, methods and computer programs for avoiding unnecessary radio measurement gaps in a non-terrestrial network are disclosed. At least some example embodiments may allow replacing an unused radio measurement gap with an option of scheduling to improve network scheduling flexibility, user throughput and/or latency, and client device battery life.

19 Claims, 3 Drawing Sheets

(56) References Cited

U.S. PATENT DOCUMENTS

| | | | | |
|---|---|---|---|---|
| 12,368,499 | B2 * | 7/2025 | Tseng | H04W 56/0045 |
| 12,389,488 | B2 * | 8/2025 | Wang | H04W 72/20 |
| 12,396,027 | B2 * | 8/2025 | Kazmi | H04L 27/0006 |
| 12,401,395 | B2 * | 8/2025 | Yu | H04B 7/01 |
| 12,407,480 | B2 * | 9/2025 | Zhang | H04L 5/0057 |
| 12,408,052 | B2 * | 9/2025 | Roy | H04B 7/18513 |
| 12,413,934 | B2 * | 9/2025 | Jeong | H04W 4/029 |
| 12,418,819 | B2 * | 9/2025 | Lin | H04B 7/18519 |
| 12,425,930 | B2 * | 9/2025 | Liang | H04W 36/0058 |
| 12,432,677 | B2 * | 9/2025 | Sun | H04B 7/18504 |
| 12,452,720 | B2 * | 10/2025 | Li | H04W 24/10 |
| 12,463,772 | B2 * | 11/2025 | Cui | H04L 5/005 |
| 12,477,409 | B2 * | 11/2025 | Tseng | H04W 36/322 |
| 12,490,310 | B2 * | 12/2025 | Khoshkholgh Dashtaki | H04W 74/0833 |
| 12,495,440 | B2 * | 12/2025 | Khoshkholgh Dashtaki | H04W 52/0229 |
| 12,501,276 | B2 * | 12/2025 | Kim | H04W 16/18 |
| 2019/0342801 | A1 * | 11/2019 | Cui | H04W 72/23 |
| 2022/0060923 | A1 | 2/2022 | Zheng et al. | |
| 2022/0078650 | A1 | 3/2022 | Lee et al. | |
| 2022/0086673 | A1 * | 3/2022 | Fujishiro | H04W 24/08 |
| 2023/0043459 | A1 * | 2/2023 | Shrestha | H04W 60/04 |
| 2023/0156544 | A1 * | 5/2023 | Wu | H04W 36/0094 370/331 |
| 2023/0362699 | A1 * | 11/2023 | Yerramalli | H04W 24/10 |
| 2023/0403585 | A1 * | 12/2023 | Ryu | H04W 24/08 |
| 2024/0080092 | A1 * | 3/2024 | Sedin | H04L 5/0051 |
| 2024/0114474 | A1 * | 4/2024 | Rune | H04L 5/0051 |
| 2024/0187910 | A1 * | 6/2024 | Deng | H04W 24/02 |
| 2024/0196195 | A1 * | 6/2024 | Shrivastava | H04W 72/21 |
| 2024/0210570 | A1 * | 6/2024 | Cai | G01S 19/34 |
| 2024/0260121 | A1 * | 8/2024 | Bae | H04W 76/15 |
| 2024/0322946 | A1 * | 9/2024 | Yan | H04L 5/0044 |
| 2024/0349145 | A1 * | 10/2024 | Chen | H04B 7/1851 |
| 2024/0349242 | A1 * | 10/2024 | Rune | H04W 68/02 |
| 2024/0389159 | A1 * | 11/2024 | Lee | H04B 7/0695 |
| 2024/0406896 | A1 * | 12/2024 | Lei | H04W 56/0015 |
| 2024/0414765 | A1 * | 12/2024 | Li | H04W 24/02 |
| 2025/0008361 | A1 * | 1/2025 | Abraham | H04W 76/15 |
| 2025/0016592 | A1 * | 1/2025 | Rune | H04B 7/18545 |
| 2025/0081060 | A1 * | 3/2025 | Li | H04W 36/0094 |
| 2025/0150874 | A1 * | 5/2025 | Kim | H04L 5/001 |
| 2025/0233650 | A1 * | 7/2025 | Watts | H04W 36/0058 |
| 2025/0234229 | A1 * | 7/2025 | Gummadi | H04W 36/0088 |
| 2025/0247728 | A1 * | 7/2025 | Cui | H04B 7/18513 |
| 2025/0274973 | A1 * | 8/2025 | Li | H04W 36/0088 |
| 2025/0280339 | A1 * | 9/2025 | Li | H04B 17/328 |
| 2025/0317766 | A1 * | 10/2025 | Tao | H04W 24/08 |
| 2025/0324240 | A1 * | 10/2025 | Lee | H04W 8/24 |
| 2025/0330847 | A1 * | 10/2025 | Kumar | H04W 24/08 |
| 2025/0330857 | A1 * | 10/2025 | Yao | H04W 12/63 |
| 2025/0330928 | A1 * | 10/2025 | Cui | H04W 56/0015 |
| 2025/0380245 | A1 * | 12/2025 | Li | H04B 7/0456 |

FOREIGN PATENT DOCUMENTS

| | | | | |
|---|---|---|---|---|
| WO | 2019/013921 | A1 | 1/2019 | |
| WO | WO-2019032032 | A1 * | 2/2019 | H04L 5/0032 |
| WO | 2022/026173 | A1 | 2/2022 | |
| WO | 2022/077281 | A1 | 4/2022 | |
| WO | 2023/003397 | A1 | 1/2023 | |

OTHER PUBLICATIONS

M. Giordani and M. Zorzi, "Non-Terrestrial Networks in the 6G Era: Challenges and Opportunities," in IEEE Network, vol. 35, No. 2, pp. 244-251, Mar.-Apr. 2021. (Year: 2021).*

G. Charbit, D. Lin, K. Medles, L. Li and I.-K. Fu, "Space-Terrestrial Radio Network Integration for IoT," 2020 2nd 6G Wireless Summit (6G Summit), Levi, Finland, 2020, pp. 1-5 (Year: 2020).*

F. Matera et al., "Terrestrial and Non-Terrestrial Networks for Integrated Sensing and Communication," 2024 IEEE International Symposium on Systems Engineering (ISSE), Perugia, Italy, 2024, pp. 1-5, (Year: 2024).*

M. Moges and T. G. Robertazzi, "Wireless sensor networks: scheduling for measurement and data reporting," in IEEE Transactions on Aerospace and Electronic Systems, vol. 42, No. 1, pp. 327-340, Jan. 2006, (Year: 2006).*

G. Pocovi, T. Kolding, M. Lauridsen, R. Mogensen, C. Markmller and R. Jess-Williams, "Measurement Framework for Assessing Reliable Real-Time Capabilities of Wireless Networks," in IEEE Communications Magazine, vol. 56, No. 12, pp. 156-163, Dec. 2018, (Year: 2018).*

"3rd Generation Partnership Project; Technical Specification Group Radio Access Network; NR; Radio Resource Control (RRC) protocol specification (Release 17)", 3GPP TS 38.331, V17.2.0, Sep. 2022, pp. 1-1298.

"3rd Generation Partnership Project; Technical Specification Group Radio Access Network; Study on New Radio (NR) to support non-terrestrial networks (Release 15)", 3GPP TR 38.811, V15.4.0, Sep. 2020, pp. 1-127.

"3rd Generation Partnership Project; Technical Specification Group Radio Access Network; Solutions for NR to support non-terrestrial networks (NTN) (Release 16)", 3GPP TR 38.821, V16.1.0, May 2021, pp. 1-140.

Finnish Application No. 20226104, "UE-Specific Time-Based Offset for Serving Cell End-Of-Coverage", filed on Dec. 14, 2022, pp. 46.

"Revised WID: NR NTN (Non-Terrestrial Networks) enhancements", 3GPP TSG RAN Meeting #97-e, RP-222654, Agenda: 9.3.2.7, Thales, Sep. 12-16, 2022, 8 pages.

"New WID on IoT NTN enhancements", 3GPP TSG RAN Meeting #94e, RP-213596, Agenda: 8.6.2, MediaTek Inc, Dec. 6-17, 2021, 5 pages.

"3rd Generation Partnership Project; Technical Specification Group Radio Access Network; NR; Requirements for support of radio resource management (Release 17)", 3GPP TS 38.133, V17.7.0, Sep. 2022, 5193 pages.

"3rd Generation Partnership Project; Technical Specification Group Radio Access Network; NR; Medium Access Control (MAC) protocol specification (Release 17)", 3GPP TS 38.321, V17.2.0, Sep. 2022, pp. 1-246.

Won et al., "Three Decades of 3GPP Target Cell Search through 3G, 4G, and 5G", IEEE Access, vol. 8, Jun. 17, 2020, pp. 116914-116960.

Office action received for corresponding Finnish Patent Application No. 20235103, dated Jul. 28, 2023, 9 pages.

"Measurement requirements in NTN Systems", 3GPP TSG-RAN WG4 Meeting # 99-e, R4-2108972, Agenda: 9.12.4.4, Qualcomm Incorporated, May 19-27, 2021, 4 pages.

* cited by examiner

AVOIDING UNNECESSARY RADIO MEASUREMENT GAPS IN A NON-TERRESTRIAL NETWORK, AND RELATED DEVICES, METHODS AND COMPUTER PROGRAMS

RELATED APPLICATION

This application was originally filed as a Finnish Patent Application No. 20235103 filed on Feb. 3, 2023, which is hereby incorporated in its entirety.

TECHNICAL FIELD

The disclosure relates generally to communications and, more particularly but not exclusively, to avoiding unnecessary radio measurement gaps in a non-terrestrial network, as well as related devices, methods and computer programs.

BACKGROUND

In a non-terrestrial network (NTN) system, base stations (such as fifth generation or 5G base stations, gNBs) may be deployed on-board or otherwise communicate via satellites to provide communication coverage over a very large area that may be otherwise unreachable by cellular networks. An NTN may be used, e.g., to connect internet of things (IoT) devices globally as well as to provide personal communications in remote areas, such as deserts, islands and open ocean, and/or in disaster situations, or the like.

Currently, Earth-fixed cells (EFC) and Earth-moving cells (EMC) are considered for NTN. The former entails the satellite continuously adjusting a satellite beam pointing direction to fix a 5G new radio (NR) cell and beam to a specific point on Earth, while the latter option entails the satellite beam pointing direction being fixed and thus the beam footprint (i.e., the 5G NR cell) moving on Earth.

Both in cellular networks and NTNs a client device, such as a user equipment (UE) utilizes radio measurement gaps to perform radio measurements, since the UE cannot perform the radio measurements while simultaneously transmitting data, receiving data and/or monitoring a control channel (e.g., a physical downlink control channel (PDCCH)) on a serving cell.

For an Earth-moving cell, UEs may have different cell serving durations depending on each UE's location within a cell coverage area. Thus, the time a UE is handed over to the next cell may be different for each UE. This means that radio measurements may be performed at different points in time. In other words, UEs may avoid doing the radio measurements at different points in time.

This also means that a UE far from a time and/or location where time and distance conditions for performing the radio measurements are met, may not need a radio measurement gap. Thus, at least in some situations a UE may be configured with a measurement gap it has no use for. Furthermore, the network may not necessarily know where the UE currently is, and therefore the network may schedule unnecessary measurement gaps which may reduce throughput of the UE.

SUMMARY

The scope of protection sought for various example embodiments of the invention is set out by the independent claims. The example embodiments and features, if any, described in this specification that do not fall under the scope of the independent claims are to be interpreted as examples useful for understanding various example embodiments of the invention.

An example embodiment of a client device comprises at least one processor, and at least one memory storing instructions that, when executed by the at least one processor, cause the client device at least to perform determining that at least one radio measurement gap in a received radio measurement gap configuration for use in a non-terrestrial network is not needed based on at least one radio measurement suspension criterion. The instructions, when executed by the at least one processor, further cause the client device at least to perform transmitting, in response, to a radio access network node a radio measurement suspension request indicating that the at least one radio measurement gap not needed is to be suspended.

In an example embodiment, alternatively or in addition to the above-described example embodiments, the radio measurement suspension request comprises at least one of:

- information about a duration for which the radio access network node (210) is not to schedule a radio measurement gap or for which the client device (200) is not to apply a radio measurement gap already scheduled by the radio access network node (210);
- information about a time when the client device (200) is expected to resume performing radio measurements according to one or more radio measurement gaps scheduled by the radio access network node (210);
- information about a pattern of periods in which radio measurement gaps are needed;
- information about a pattern of periods in which the radio measurement gaps are not needed;
- information about a number of consecutive radio measurement gaps the client device (200) is planning not to use;
- information about a prolonged or scaled radio measurement gap periodicity; or
- information about an applied radio measurement gap pattern identifier.

In an example embodiment, alternatively or in addition to the above-described example embodiments, the instructions, when executed by the at least one processor, further cause the client device to perform at least halting from performing radio measurements during the at least one radio measurement gap not needed.

In an example embodiment, alternatively or in addition to the above-described example embodiments, the instructions, when executed by the at least one processor, further cause the client device to perform at least one of transmitting data, receiving data, or monitoring a control channel during the at least one radio measurement gap not needed.

In an example embodiment, alternatively or in addition to the above-described example embodiments, the instructions, when executed by the at least one processor, further cause the client device to perform receiving a grant or a rejection of the transmitted radio measurement suspension request from the radio access network node, and proceeding or not proceeding to the transmitting of the data, the receiving of the data, or the monitoring of the control channel during the at least one radio measurement gap based on the received grant or rejection, respectively.

In an example embodiment, alternatively or in addition to the above-described example embodiments, the instructions, when executed by the at least one processor, further cause the client device to perform indicating to the radio access network node a repetition determined in periods in which the radio measurement gaps are not needed.

In an example embodiment, alternatively or in addition to the above-described example embodiments, the at least one radio measurement gap not needed comprises colliding radio measurement gaps.

In an example embodiment, alternatively or in addition to the above-described example embodiments, the instructions, when executed by the at least one processor, further cause the client device to perform the transmitting of the radio measurement suspension request in one of: an uplink medium access control control element, a scheduling request, or a buffer status report.

In an example embodiment, alternatively or in addition to the above-described example embodiments, the at least one radio measurement suspension criterion comprises at least one of: location information of the client device, trajectory information of the client device, ephemeris information of a serving cell of the client device, ephemeris information of one or more neighboring cells of the client device, radio coverage information of the serving cell of the client device, radio coverage information of the one or more neighboring cells of the client device, conditional handover trigger information, or information about an amount of data remaining in an uplink transmission buffer of the client device.

An example embodiment of a method comprises determining, by a client device, that at least one radio measurement gap in a received radio measurement gap configuration for use in a non-terrestrial network is not needed based on at least one radio measurement suspension criterion. The method further comprises transmitting, in response, from the client device to a radio access network node a radio measurement suspension request indicating that the at least one radio measurement gap not needed is to be suspended.

In an example embodiment, alternatively or in addition to the above-described example embodiments, the radio measurement suspension request comprises at least one of:

- information about a duration for which the radio access network node (210) is not to schedule a radio measurement gap or for which the client device (200) is not to apply a radio measurement gap already scheduled by the radio access network node (210);
- information about a time when the client device (200) is expected to resume performing radio measurements according to one or more radio measurement gaps scheduled by the radio access network node (210);
- information about a pattern of periods in which radio measurement gaps are needed;
- information about a pattern of periods in which the radio measurement gaps are not needed;
- information about a number of consecutive radio measurement gaps the client device (200) is planning not to use;
- information about a prolonged or scaled radio measurement gap periodicity; or
- information about an applied radio measurement gap pattern identifier.

In an example embodiment, alternatively or in addition to the above-described example embodiments, the method further comprises halting from performing radio measurements during the at least one radio measurement gap not needed.

In an example embodiment, alternatively or in addition to the above-described example embodiments, the method further comprises at least one of transmitting data, receiving data, or monitoring a control channel during the at least one radio measurement gap not needed.

In an example embodiment, alternatively or in addition to the above-described example embodiments, the method further comprises receiving at the client device a grant or a rejection of the transmitted radio measurement suspension request from the radio access network node, and proceeding or not proceeding by the client device to the transmitting of the data, the receiving of the data, or the monitoring of the control channel during the at least one radio measurement gap based on the received grant or rejection, respectively.

In an example embodiment, alternatively or in addition to the above-described example embodiments, the method further comprises indicating by the client device to the radio access network node a repetition determined in periods in which the radio measurement gaps are not needed.

In an example embodiment, alternatively or in addition to the above-described example embodiments, the at least one radio measurement gap not needed comprises colliding radio measurement gaps.

In an example embodiment, alternatively or in addition to the above-described example embodiments, the method further comprises transmitting from the client device the radio measurement suspension request in one of: an uplink medium access control control element, a scheduling request, or a buffer status report.

In an example embodiment, alternatively or in addition to the above-described example embodiments, the at least one radio measurement suspension criterion comprises at least one of: location information of the client device, trajectory information of the client device, ephemeris information of a serving cell of the client device, ephemeris information of one or more neighboring cells of the client device, radio coverage information of the serving cell of the client device, radio coverage information of the one or more neighboring cells of the client device, conditional handover trigger information, or information about an amount of data remaining in an uplink transmission buffer of the client device.

An example embodiment of a computer program comprises instructions for causing a client device to perform at least the following: determining that at least one radio measurement gap in a received radio measurement gap configuration for use in a non-terrestrial network is not needed based on at least one radio measurement suspension criterion. The instructions, when executed by the at least one processor, further cause the client device at least to perform transmitting, in response, to a radio access network node a radio measurement suspension request indicating that the at least one radio measurement gap not needed is to be suspended.

DESCRIPTION OF THE DRAWINGS

The accompanying drawings, which are included to provide a further understanding of the embodiments and constitute a part of this specification, illustrate embodiments and together with the description help to explain the principles of the embodiments. In the drawings.

Like reference numerals are used to designate like parts in the accompanying drawings.

DETAILED DESCRIPTION

Reference will now be made in detail to embodiments, examples of which are illustrated in the accompanying drawings. The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
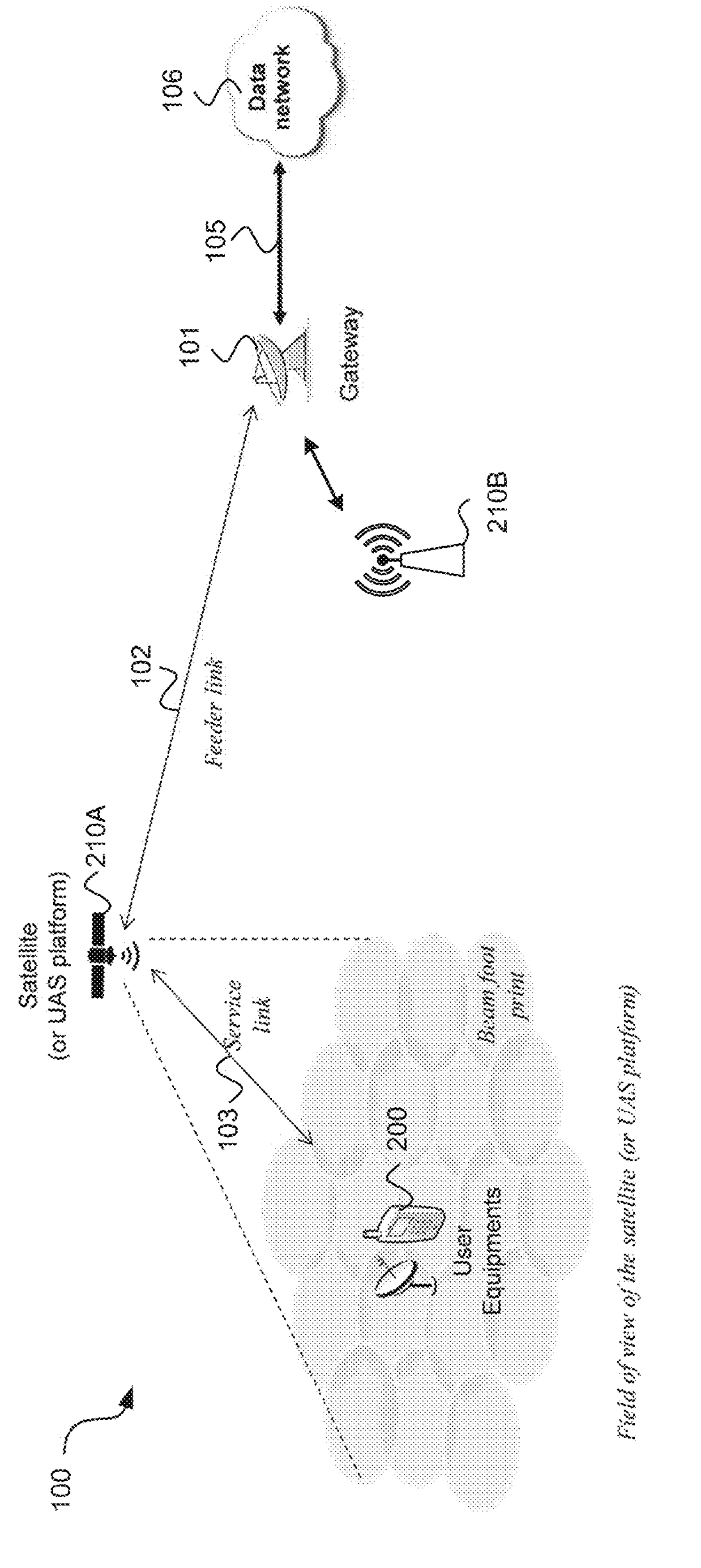
FIG. 1 shows an example embodiment of the subject matter described herein illustrating an example a non-terrestrial network, where various embodiments of the present disclosure may be implemented.

FIG. 1 illustrates an example non-terrestrial network (NTN) 100, where various embodiments of the present disclosure may be implemented. An example representation of the NTN 100 is shown depicting a client device 200, radio access network nodes 210A and 210B (which may be alternatives to each other), a gateway 101, as well as a data network 106. The radio access network node 210A may correspond to or be included in a satellite. The radio access network node 210A may communicate with the gateway 101 via a feeder link 102. There may be a link connection 105 between the gateway 101 and the data network 106. The radio access network node 210A may access the data network 106 via the feeder link 102, the gateway 101, and/or the link connection 105 between the gateway 101 and the data network 106. Such an architecture in which the radio access network node 210A may correspond to or be included in the satellite is known as a regenerative architecture.

On the other hand, a transparent architecture utilizes the radio access network node 210B located on Earth. The radio access network node 210B connects to the client device 200 via the NTN gateway 101, the feeder link 102, the satellite, and an air/space borne vehicle communication connection 103. I.e., the satellite acts as a relay/mirror of transmissions between the client device 200 and the radio access network node 210B.

The client device 200 may include, e.g., a mobile phone, a smartphone, a tablet computer, a smart watch, or any hand-held, portable and/or wearable device. The client device 200 may also be referred to as a user equipment (UE). The client device 200 may communicate with the radio access network node 210A via, e.g., the air/space borne vehicle communication connection 103, such as a service link.

It may be desirable to enable various network technologies, such as 5G new radio (NR), to support the usage of NTN within the context of cellular networks. NTNs may be able to provide seamless coverage on remote areas, such as deserts, islands and open ocean, and/or in disaster situations, or the like, by utilizing satellites as the base station or gNB in 5G networks.

In the following, various example embodiments will be discussed. At least some of these example embodiments described herein may allow avoiding unnecessary radio measurement gaps in a non-terrestrial network.

At least some of the example embodiments described herein may allow replacing an unused measurement gap with an option of scheduling to improve network scheduling flexibility, user throughput and/or latency, and client device battery life.

At least some of the example embodiments described herein may allow simple signaling options for the client device to inform the radio access network about the unused measurement gaps when the client device is performing measurement relaxation.

At least some of the example embodiments described herein may allow the network side to better utilize available radio resources, hence improving overall spectral efficiency. The UE's throughput and/or latency may also be improved as more time can be used for transmitting data since the network side can be made aware that a measurement gap will not be used. This may be particularly helpful in NTNs, where cells may only be available for a short amount of time.

At least some of the example embodiments described herein may allow the UE and network side to utilize time-domain resources which would otherwise be blocked by measurement gaps. This may be very useful in NTNs where the availability in time of a given Earth-moving cell can be limited, e.g., down to 5-7 seconds.

Figure 2:
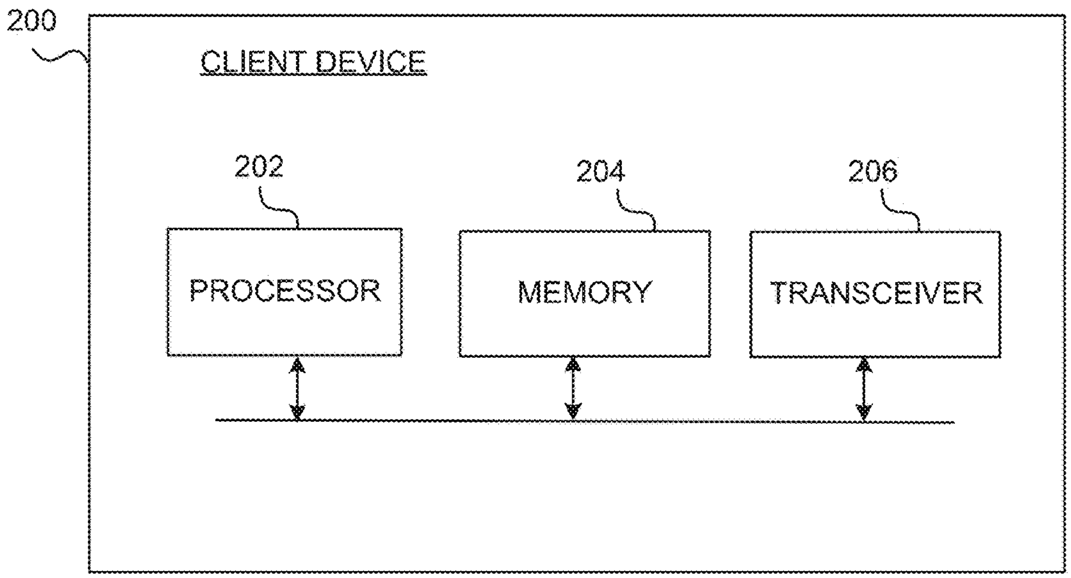
FIG. 2 shows an example embodiment of the subject matter described herein illustrating a client device.

FIG. 2 is a block diagram of the client device 200, in accordance with an example embodiment.

The client device 200 comprises one or more processors 202 and one or more memories 204 that comprise computer program code. The client device 200 may also include other elements, such as a transceiver 206 configured to enable the client device 200 to transmit and/or receive information to/from other devices, as well as other elements not shown in FIG. 2. In one example, the client device 200 may use the transceiver 206 to transmit or receive signaling information and data in accordance with at least one cellular communication protocol. The transceiver 206 may be configured to provide at least one wireless radio connection, such as for example a 3GPP mobile broadband connection (e.g., 5G or beyond). The transceiver 206 may comprise, or be configured to be coupled to, at least one antenna to transmit and/or receive radio frequency signals.

Although the client device 200 is depicted to include only one processor 202, the client device 200 may include more processors. In an embodiment, the memory 204 is capable of storing instructions, such as an operating system and/or various applications. Furthermore, the memory 204 may include a storage that may be used to store, e.g., at least some of the information and data used in the disclosed embodiments.

Furthermore, the processor 202 is capable of executing the stored instructions. In an embodiment, the processor 202 may be embodied as a multi-core processor, a single core processor, or a combination of one or more multi-core processors and one or more single core processors. For example, the processor 202 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, a neural network (NN) chip, an artificial intelligence (AI) accelerator, a tensor processing unit (TPU), a neural processing unit (NPU), or the like. In an embodiment, the processor 202 may be configured to execute hard-coded functionality. In an embodiment, the processor 202 is embodied as an executor of software instructions, wherein the instructions may specifically configure the processor 202 to perform the algorithms and/or operations described herein when the instructions are executed.

The memory 204 may be embodied as one or more volatile memory devices, one or more non-volatile memory devices, and/or a combination of one or more volatile memory devices and non-volatile memory devices. For example, the memory 204 may be embodied as semiconductor memories (such as mask ROM, PROM (programmable ROM), EPROM (erasable PROM), flash ROM, RAM (random access memory), etc.).

The client device 200 may comprise any of various types of devices used directly by an end user entity and capable of communication in a wireless network, such as user equipment (UE). Such devices include but are not limited to smartphones, tablet computers, smart watches, lap top computers, internet-of-things (IoT) devices, massive machine-to-machine (M2M) devices, massive machine type communications (mMTC) devices, industrial internet-of-things (IIoT) devices, enhanced mobile broadband (cMBB) devices, ultra-reliable low-latency communication (URLLC) devices, and/or devices mounted in vehicles, etc.

When executed by the at least one processor 202, instructions stored in the at least one memory 204 cause the client device 200 at least to perform determining that at least one radio measurement gap in a received radio measurement gap configuration for use in a non-terrestrial network 100 is not needed based on at least one radio measurement suspension criterion. For example, a radio measurement may comprise a radio resources management (RRM)-related measurement.

For example, the at least one radio measurement suspension criterion may comprise location information of the client device 200, trajectory/future location information of the client device 200, ephemeris information of a serving cell of the client device 200, ephemeris information of one or more neighboring cells of the client device 200, radio coverage information of the serving cell of the client device 200, radio coverage information of the one or more neighboring cells of the client device 200, conditional handover (CHO) trigger information, and/or information about an amount of data remaining in an uplink transmission buffer (indicating estimated connection time) of the client device 200. If only little data is left in the uplink transmission buffer, no measurement gaps may be needed, because the client device 200 may move to a radio resource control (RRC) idle/inactive state. The radio coverage information may comprise, e.g., information about a radius, a center and/or an elevation angle, such as that provided in a system information broadcast.

In other words, the client device 200 first checks whether a measurement gap applies or can be avoided, based on the above criteria. If the measurement gap can be avoided, the client device 200 may be able to perform radio measurement relaxation by skipping radio measurement(s) during the at least one radio measurement gap that is not needed. At least in some embodiments, the client device 200 may be configured with multiple potentially overlapping measurement gaps and may check for each of them.

The instructions, when executed by the at least one processor 202, further cause the client device 200 at least to perform transmitting, in response, to a radio access network node 210 a radio measurement suspension request indicating that the at least one radio measurement gap not needed is to be suspended. In other words, if the client device 200 determines at least one measurement gap that is not needed, the client device 200 informs the radio access network node 210. At least in some embodiments, the radio access network node 210 may correspond with the radio access network node 210A or the radio access network node 210B of FIG. 1.

At least in some embodiments, the radio measurement suspension request may comprise information about a duration for which the radio access network node 210 is not to schedule a radio measurement gap, e.g., the time the client device 200 is performing the radio measurement relaxation.

At least in some embodiments, the radio measurement suspension request may further comprise information about a time when the client device 200 is expected to resume performing radio measurements, e.g., the time the client device 200 exits a measurement relaxation area.

At least in some embodiments, the radio measurement suspension request may further comprise at least one of information about a pattern of periods in which radio measurement gaps are needed or information about a pattern of periods in which the radio measurement gaps are not needed. At least in some embodiments, these periods may cover multiple serving cells.

At least in some embodiments, the radio measurement suspension request may further comprise information about a number of consecutive radio measurement gaps the client device 200 is planning not to use.

At least in some embodiments, the radio measurement suspension request may further comprise at least one of information about a prolonged or scaled radio measurement gap periodicity (e.g., twice as long as the configured radio measurement gap periodicity indicates that the client device 200 only utilizes every second measurement gap), or information about an applied radio measurement gap pattern identifier.

The example table below defines some measurement gap lengths that may be configured with different measurement gap repetition periods, e.g., IDs 6-9 all have 4 ms gap, but a periodicity of 20, 40, 80, 160 milliseconds (ms), respectively.

Gap Pattern Configurations

| Gap Pattern ID | Measurement Gap Length (ms) | Measurement Gap Repetition Period (ms) |
|---|---|---|
| 0 | 6 | 40 |
| 1 | 6 | 80 |
| 2 | 3 | 40 |
| 3 | 3 | 80 |
| 4 | 6 | 20 |
| 5 | 6 | 160 |
| 6 | 4 | 20 |
| 7 | 4 | 40 |
| 8 | 4 | 80 |
| 9 | 4 | 160 |
| 10 | 3 | 20 |
| 11 | 3 | 160 |
| 12 | 5.5 | 20 |
| 13 | 5.5 | 40 |
| 14 | 5.5 | 80 |
| 15 | 5.5 | 160 |
| 16 | 3.5 | 20 |
| 17 | 3.5 | 40 |
| 18 | 3.5 | 80 |
| 19 | 3.5 | 160 |
| 20 | 1.5 | 20 |
| 21 | 1.5 | 40 |
| 22 | 1.5 | 80 |
| 23 | 1.5 | 160 |
| 24 | 10 | 80 |
| 25 | 20 | 160 |

At least in some embodiments, the instructions, when executed by the at least one processor 202, may further cause the client device 200 to perform at least halting from performing radio measurements during the at least one radio measurement gap not needed.

At least in some embodiments, the instructions, when executed by the at least one processor 202, may further cause the client device 200 to perform transmitting data, receiving data, and/or monitoring a control channel during the at least one radio measurement gap not needed.

In other words, the client device 200 may perform data reception, data transmission and/or control channel monitoring during the time period which would have otherwise been occupied by the skipped radio measurement gap(s).

Figure 3:
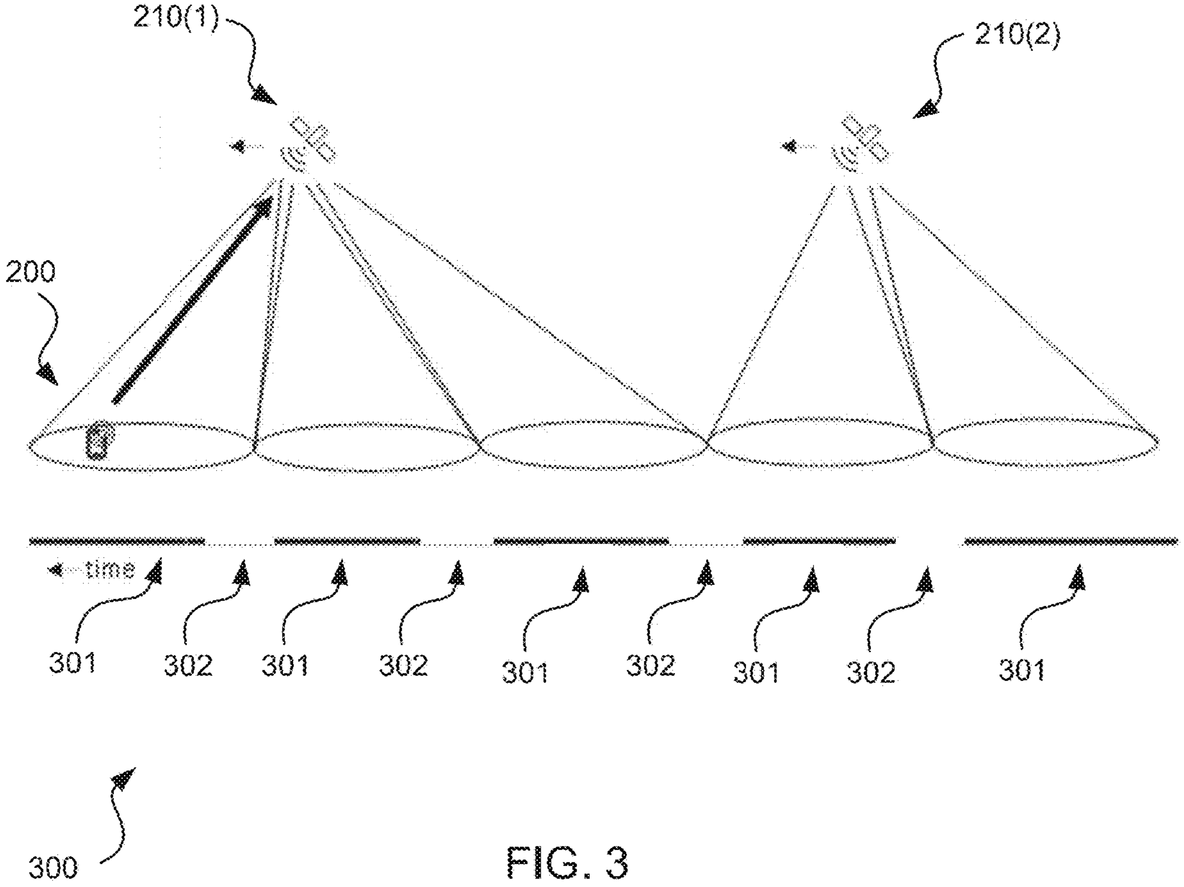
FIG. 3 shows an example embodiment of the subject matter described herein illustrating the disclosure.

Diagram 300 of FIG. 3 illustrates an example of the disclosure. The client device 200 informs the radio access network node 210 on-board a satellite when/which radio measurements gaps are not needed, and optionally the client device 200 may also inform, e.g., the pattern of periods, shown in diagram 300 with periods 301 corresponding to periods when the radio measurements gaps are not needed and periods 302 corresponding to periods when the radio measurements gaps are needed.

At least in some embodiments, the instructions, when executed by the at least one processor 202, may further cause the client device 200 to perform receiving a grant or a rejection of the transmitted radio measurement suspension request from the radio access network node 210, and proceeding or not proceeding to the transmitting of the data, the receiving of the data, or the monitoring of the control channel during the at least one radio measurement gap based on the received grant or rejection, respectively. In other words, the client device 200 decision to skip a radio measurement gap may be treated as a request by the radio access network node 210, and the radio access network node 210 may send, e.g., a "requestGranted" or "requestRejected" reply back, indicating whether the client device 200 is allowed to skip the next radio measurement gap.

At least in some embodiments, the instructions, when executed by the at least one processor 202, may further cause the client device 200 to perform indicating to the radio access network node 210 a repetition determined in periods in which the radio measurement gaps are not needed. In other words, if the client device 200 foresees for instance in case of a longer data transmission that there will be a repetition in the periods where radio measurements may be skipped (e.g., when a satellite in a same orbit is passing over the client device 200), the client device 200 may indicate this to the radio access network node 210 by, e.g., an RRC message (such as RRC UE assistance information type of signalling).

At least in some embodiments, the at least one radio measurement gap not needed may comprise colliding radio measurement gaps. The concept of colliding gaps refers to one or more radio measurement gaps being partially or fully overlapping. In such situations, the client device 200 may check if all colliding gaps can be skipped. In this case, the client device 200 may only trigger signalling if all the radio measurement gaps can be skipped. The radio access network node 210 may implicitly understand that the client device 200 is signalling that a given gap and all colliding gap opportunities may be skipped.

At least in some embodiments, the instructions, when executed by the at least one processor 202, may further cause the client device 200 to perform the transmitting of the radio measurement suspension request in an uplink medium access control control element (MAC-CE) which may have a low payload.

For example, a MAC-CE octet may be configured to provide information about:

- an identifier (ID) of a measurement object (measObj) or an ID of a configured SS/PBCH (synchronization signal/physical broadcast channel) block measurement timing configuration (SMTC) to be skipped,
- a number of consecutive instances of the measurement gap (0 . . . X−1) to be skipped, and/or
- any of the options for the radio measurement suspension request described above.

At least in some embodiments, the client device 200 may inform the radio access network node 210 about its intention to not use the upcoming measurement gap shortly before the start of the gap, e.g., via a MAC CE.

At least in some embodiments, the instructions, when executed by the at least one processor 202, may further cause the client device 200 to perform the transmitting of the radio measurement suspension request in a scheduling request (SR) or a buffer status report (BSR). In other words, the client device 200 may indicates that no measurement gaps are needed as part of the SR or BSR.

Figure 4:
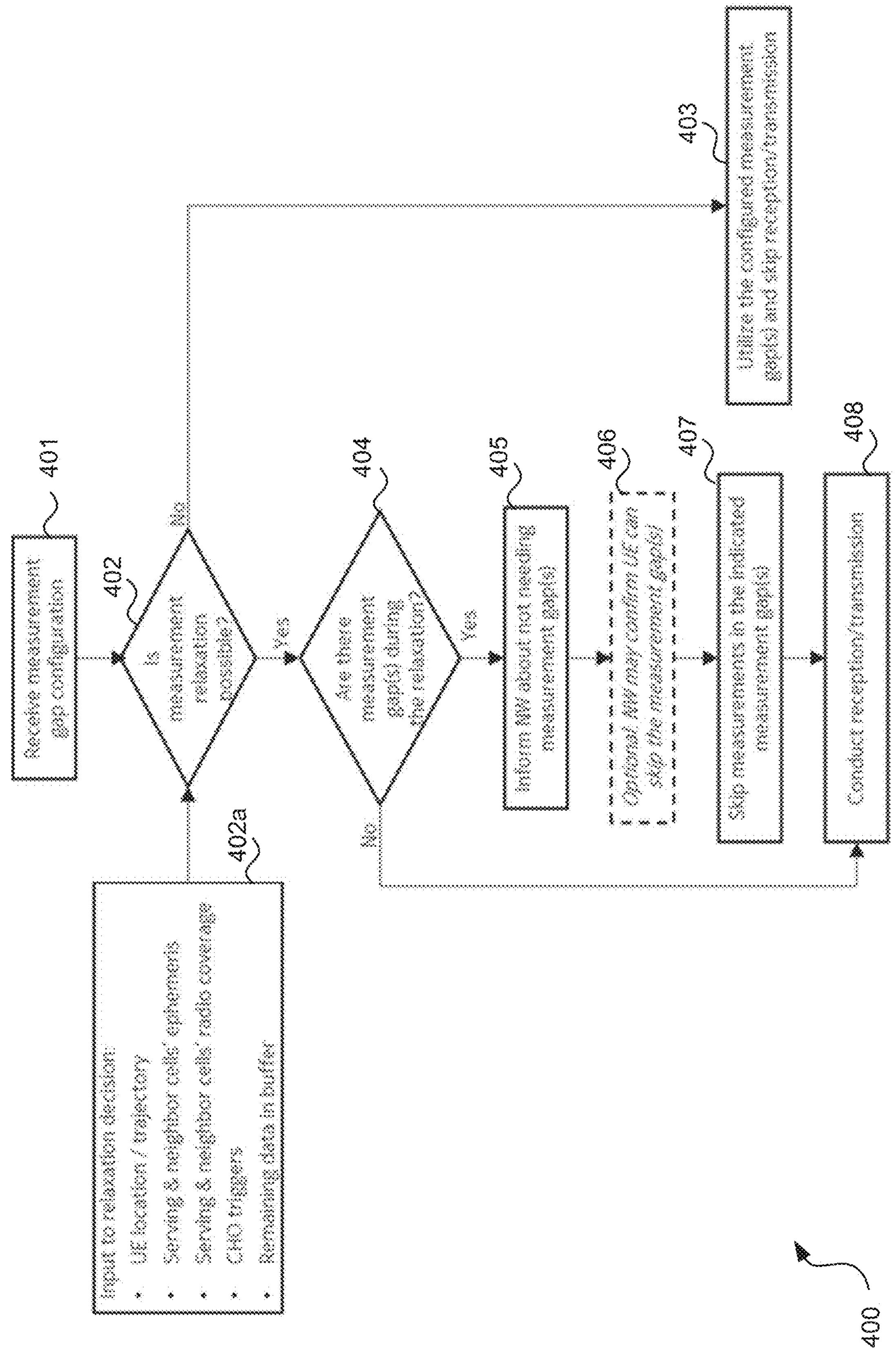
FIG. 4 shows an example embodiment of the subject matter described herein illustrating a method.

FIG. 4 illustrates an example flow chart of a method 400, in accordance with an example embodiment.

At optional operation 401, the client device 200 may receive the radio measurement gap configuration for use in the non-terrestrial network 100.

At operations 402, 404, the client device 200 determines that at least one radio measurement gap in a received radio measurement gap configuration for use in a non-terrestrial network 100 is not needed based on at least one radio measurement suspension criterion. For example, at operation 402, the client device 200 may check whether radio measurement relaxation is possible based on the at least one radio measurement suspension criterion 402*a*. If not, the client device 200 may proceed to optional operation 403 to utilize the received radio measurement gap configuration. If yes, the client device 200 may proceed to operation 404 and check whether there are measurement gap(s) during the radio measurement relaxation. If not, the client device 200 may proceed to optional operation 408 to conduct reception and/or transmission of data. If yes, the client device 200 may proceed to operation 405 to transmit to the radio access network node 210 the radio measurement suspension request indicating that the at least one radio measurement gap not needed is to be suspended.

At optional operation 406, the client device 200 may receive a grant or a rejection of the transmitted radio measurement suspension request from the radio access network node 210.

At optional operation 407, the client device 200 may skip/suspend radio measurements during the at least one radio measurement gap not needed.

At optional operation 408, the client device 200 may transmit and/or receive data during the at least one radio measurement gap not needed.

The method 400 may be performed by the client device 200 of FIG. 2. The operations 401-408 can, for example, be performed by the at least one processor 202 and the at least one memory 204. Further features of the method 400 directly result from the functionalities and parameters of the client device 200, and thus are not repeated here. The method 400 can be performed by computer program(s).

The client device 200 may comprise means for performing at least one method described herein. In one example, the means may comprise the at least one processor 202, and the at least one memory 204 storing instructions that, when executed by the at least one processor, cause the client device 200 to perform the method.

The functionality described herein can be performed, at least in part, by one or more computer program product components such as software components. According to an embodiment, the client device 200 may comprise a processor or processor circuitry, such as for example a microcontroller, configured by the program code when executed to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), and Graphics Processing Units (GPUs).

Any range or device value given herein may be extended or altered without losing the effect sought. Also, any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the embodiments described above may be combined with aspects of any of the other embodiments described to form further embodiments without losing the effect sought.

The term 'comprising' is used herein to mean including the method, blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A client device, comprising:

at least one processor; and at least one memory storing instructions that, when executed by the at least one processor, cause the client device at least to perform:

determining that at least one radio measurement gap in a received radio measurement gap configuration for use in a non-terrestrial network is not needed based on at least one radio measurement suspension criterion; and in response, transmitting to a radio access network node a radio measurement suspension request indicating that the at least one radio measurement gap not needed is to be suspended.

2. The client device according to claim 1, wherein the radio measurement suspension request comprises at least one of: information about a duration for which the radio access network node is not to schedule a radio measurement gap or for which the client device is not to apply a radio measurement gap already scheduled by the radio access network node.

3. The client device according to claim 1, wherein the radio measurement suspension request comprises information about a time when the client device is expected to resume performing radio measurements according to one or more radio measurement gaps scheduled by the radio access network node.

4. The client device according to claim 1, wherein the radio measurement suspension request comprises at least one of: information about a pattern of periods in which radio measurement gaps are needed, or information about a pattern of periods in which the radio measurement gaps are not needed.

5. The client device according to claim 1, wherein the radio measurement suspension request comprises information about a number of consecutive radio measurement gaps the client device is planning not to use.

6. The client device according to claim 1, wherein the radio measurement suspension request comprises information about a prolonged or scaled radio measurement gap periodicity.

7. The client device according to claim 1, wherein the radio measurement suspension request comprises information about an applied radio measurement gap pattern identifier.

8. The client device according to claim 1, wherein the instructions, when executed by the at least one processor, further cause the client device to perform at least halting from performing radio measurements during the at least one radio measurement gap not needed.

9. The client device according to claim 1, wherein the instructions, when executed by the at least one processor, further cause the client device to perform at least one of transmitting data, receiving data, or monitoring a control channel during the at least one radio measurement gap not needed.

10. The client device according to claim 9, wherein the instructions, when executed by the at least one processor, further cause the client device to perform receiving a grant or a rejection of the transmitted radio measurement suspension request from the radio access network node, and proceeding or not proceeding to the transmitting of the data, the receiving of the data, or the monitoring of the control channel during the at least one radio measurement gap based on the received grant or rejection, respectively.

11. The client device according to claim 1, wherein the instructions, when executed by the at least one processor, further cause the client device to perform indicating to the radio access network node a repetition determined in periods in which the radio measurement gaps are not needed.

12. The client device according to claim 1, wherein the at least one radio measurement gap not needed comprises colliding radio measurement gaps.

13. The client device according to claim 1, wherein the instructions, when executed by the at least one processor, further cause the client device to perform the transmitting of the radio measurement suspension request in one of: an uplink medium access control control element, a scheduling request, or a buffer status report.

14. The client device according to claim 1, wherein the at least one radio measurement suspension criterion comprises at least one of: location information of the client device or trajectory information of the client device.

15. The client device according to claim 1, wherein the at least one radio measurement suspension criterion comprises at least one of: ephemeris information of a serving cell of the client device or ephemeris information of one or more neighboring cells of the client device.

16. The client device according to claim 1, wherein the at least one radio measurement suspension criterion comprises at least one of: radio coverage information of the serving cell of the client device or radio coverage information of the one or more neighboring cells of the client device.

17. The client device according to claim 1, wherein the at least one radio measurement suspension criterion comprises conditional handover trigger information.

18. The client device according to claim 1, wherein the at least one radio measurement suspension criterion comprises information about an amount of data remaining in an uplink transmission buffer of the client device.

19. A method, comprising:

determining, by a client device, that at least one radio measurement gap in a received radio measurement gap configuration for use in a non-terrestrial network is not needed based on at least one radio measurement suspension criterion; and in response, transmitting from the client device to a radio access network node a radio measurement suspension request indicating that the at least one radio measurement gap not needed is to be suspended.

* * * * *